(12) United States Patent
Jiang et al.

(10) Patent No.: US 11,310,559 B2
(45) Date of Patent: Apr. 19, 2022

(54) METHOD AND APPARATUS FOR RECOMMENDING VIDEO (71) Applicant: BEIJING BAIDU NETCOM SCIENCE AND TECHNOLOGY CO., LTD., Beijing (CN)

(72) Inventors: Hang Jiang, Beijing (CN); Minghao Liu, Beijing (CN); Yang Liang, Beijing (CN); Shuangshuang Qiao, Beijing (CN); Siyu An, Beijing (CN); Kaihua Song, Beijing (CN); Xiangyue Lin, Beijing (CN); Hua Chai, Beijing (CN); Faen Zhang, Beijing (CN); Jiangliang Guo, Beijing (CN); Jingbo Huang, Beijing (CN); Xu Li, Beijing (CN); Jin Tang, Beijing (CN); Shiming Yin, Beijing (CN)

(73) Assignee: BEIJING BAIDU NETCOM SCIENCE & TECHNOLOGY CO., LTD, Beijing (CN)

( * ) Notice: Subject to any disclaimer, the term of this patent is extended or adjusted under 35 U.S.C. 154(b) by 0 days.

(21) Appl. No.: 16/255,725

(22) Filed: Jan. 23, 2019

(65) Prior Publication Data
US 2019/0253760 A1 Aug. 15, 2019

(30) Foreign Application Priority Data
Feb. 12, 2018 (CN) .......................... 201810145095.4

(51) Int. Cl.
*H04N 21/466* (2011.01)

(52) U.S. Cl.
CPC ..... *H04N 21/4668* (2013.01); *H04N 21/4662* (2013.01)

(58) Field of Classification Search
CPC ........... H04N 21/4532; H04N 21/4668; H04N 21/4826; H04N 21/44222; H04N 21/25891; H04N 21/8549; H04N 21/251; H04N 21/84
See application file for complete search history.

(56) References Cited

U.S. PATENT DOCUMENTS

| 8,776,149 | B1 * | 7/2014 | Koch | H04N 21/44222 725/88 |
| 9,165,255 | B1 * | 10/2015 | Shetty | G06N 7/005 |
| 10,394,408 | B1 * | 8/2019 | Freund | G06Q 30/00 |

(Continued)

FOREIGN PATENT DOCUMENTS

CN 102184235 A 9/2011

Primary Examiner — Jason Salce
(74) Attorney, Agent, or Firm — Lathrop GPM LLP (57) ABSTRACT

Embodiments of the present disclosure disclose a method and apparatus for recommending a video. A specific implementation of the method includes: finding a recommended video corresponding to a target video from all candidate videos based on similarities of content characteristics of the videos, the target video being a video to be played on a terminal of a user; and sending play information of the recommended video corresponding to the target video to the terminal of the user. The method finds a video similar on video content to the target video that the user desires to view based on the content characteristic of the video, and recommends the video similar on video content to the target video that the user desires to view to the user.

5 Claims, 4 Drawing Sheets (56) References Cited

U.S. PATENT DOCUMENTS

| | | | |
|---|---|---|---|
| 10,489,016 B1* | 11/2019 | Yue | H04N 21/2387 |
| 2007/0255707 A1* | 11/2007 | Tresser | H04N 21/4668 |
| 2009/0178081 A1* | 7/2009 | Goldenberg | G06F 3/0482 |
| | | | 725/46 |
| 2013/0114902 A1* | 5/2013 | Sukthankar | H04N 9/8205 |
| | | | 382/190 |
| 2014/0092990 A1* | 4/2014 | Vuskovic | H04N 21/2743 |
| | | | 375/240.26 |
| 2015/0100987 A1* | 4/2015 | Whitman | G06F 16/313 |
| | | | 725/53 |
| 2015/0143394 A1* | 5/2015 | Hijikata | H04N 21/45457 |
| | | | 725/14 |
| 2015/0331951 A1* | 11/2015 | Wang | H04L 67/306 |
| | | | 707/734 |
| 2015/0350730 A1* | 12/2015 | el Kaliouby | A61B 5/165 |
| | | | 725/12 |
| 2017/0053027 A1* | 2/2017 | Simske | G06F 16/3334 |
| 2017/0060870 A1 | 3/2017 | Checkley | |
| 2017/0300570 A1* | 10/2017 | Chiarandini | H04N 21/8405 |
| 2018/0152763 A1* | 5/2018 | Barlaskar | G06Q 30/0255 |
| 2019/0057258 A1* | 2/2019 | Simske | H04N 21/4665 |
| 2019/0164209 A1* | 5/2019 | Park | G06K 9/00671 |

\* cited by examiner

METHOD AND APPARATUS FOR RECOMMENDING VIDEO

CROSS-REFERENCE TO RELATED APPLICATIONS

This application is related to and claims priority from Chinese Application No. 201810145095.4, filed on Feb. 12, 2018 and entitled "Method and Apparatus for Recommending Video," the entire disclosure of which is hereby incorporated by reference.

TECHNICAL FIELD

The present disclosure relates to the field of computer, specifically to the field of Internet, and more specifically to a method and apparatus for recommending a video.

BACKGROUND

When providing the video service to a user, while video data of the video that the user desires to view is sent to the terminal of the user, a video related to the video that the user desires to view may be recommended to the user as a recommended video. At present, a typical method for recommending a video is finding a video similar on video name to the video that the user desires to view based on the name of the video, and recommending the video similar on video name to the video that the user desires to view as the recommended video to the user.

SUMMARY

Embodiments of the present disclosure provide a method and apparatus for recommending a video.

In a first aspect, the embodiments of the present disclosure provide a method for recommending a video. The method includes: finding a recommended video corresponding to a target video from all candidate videos based on similarities of content characteristics of the videos, the target video being a video to be played on a terminal of a user; and sending play information of the recommended video corresponding to the target video to the terminal of the user.

In a second aspect, the embodiments of the present disclosure provide an apparatus for recommending a video. The apparatus includes: a finding unit, configured to find a recommended video corresponding to a target video from all candidate videos based on similarities of content characteristics of the videos, the target video being a video to be played on a terminal of a user; and a recommendation unit, configured to send play information of the recommended video corresponding to the target video to the terminal of the user.

By finding a recommended video corresponding to a target video from all candidate videos based on similarities of content characteristics of the videos, the target video being a video to be played on a terminal of a user, and sending play information of the recommended video corresponding to the target video to the terminal of the user, the method and apparatus for recommending a video provided by the embodiments of the present disclosure find a video similar on video content to the target video that the user desires to view based on the content characteristic of the video, and recommend the video similar on video content to the target video that the user desires to view to the user.

BRIEF DESCRIPTION OF THE DRAWINGS

After reading detailed descriptions of non-limiting embodiments with reference to the following accompanying drawings, other characteristics, objectives and advantages of the present disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
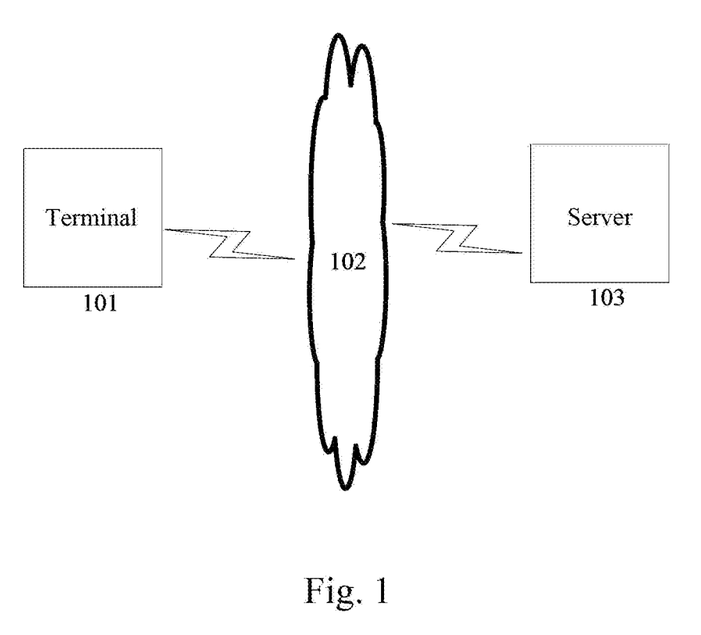
FIG. 1 illustrates a system architecture in which an embodiment of a method or apparatus for recommending a video according to the present disclosure may be implemented.

FIG. 1 illustrates a system architecture in which an embodiment of a method or apparatus for recommending a video according to the present disclosure may be implemented.

As shown in FIG. 1, the system architecture may include a terminal 101, a network 102, and a server 103. The network 102 may be a wireless communication network or a wired communication network.

The terminal 101 may be various electronic devices having display screens and supporting network communications, including but not limited to smartphones, tablets, e-book readers, laptop portable computers, desktop computers, or the like.

The server 103 may acquire a large number of candidate videos in advance. When the user of the terminal 101 desires to view a video, the terminal 101 may send a play request including the address of the video that the user of the terminal 101 desires to view to the server, and send the play request to the server 103.

The server 103 may send video data of the target video to the terminal 101. At the same time, the server 103 may find a video similar on video content to the video that the user desires to view, send play information of the found video similar on video content to the video that the user desires to view to the terminal 101, and recommend the video similar on video content to the video that the user of the terminal 101 desires to view to the user of the terminal 101.

Figure 2:
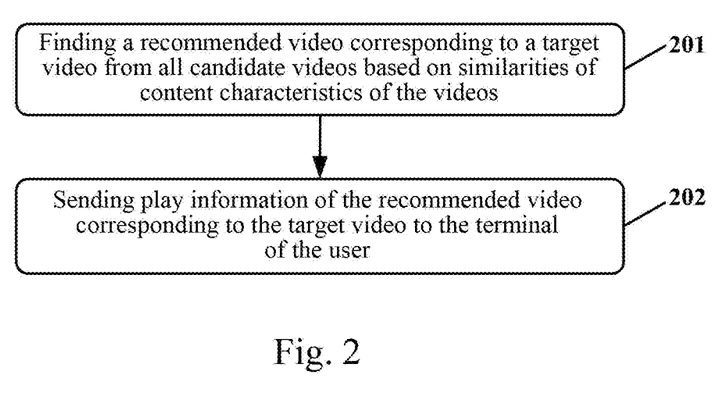
FIG. 2 illustrates a flowchart of an embodiment of a method for recommending a video according to the present disclosure.

With reference to FIG. 2, a flow of an embodiment of a method for recommending a video according to the present disclosure is illustrated. The method for recommending a video provided by the embodiments of the present disclosure may be executed by a server (such as the server 103 in FIG. 1). The method includes the following steps.

Step 201, finding a recommended video corresponding to a target video from all candidate videos based on similarities of content characteristics of the videos.

In the present embodiment, candidate videos may be acquired in advance by the server. The number of the candidate videos acquired by the server is plural.

In the present embodiment, the content characteristic of a video is associated with images in the video. For example, the content characteristic includes: the type of object that appears in the images in the video, the text in the images in the video, and the like.

In the present embodiment, when the user desires to view a video, the play button of the video may be clicked. After the user clicks the play button of the video, a play request is generated at the terminal of the user to request the video data of the video from the server. The play request includes the address of the video, and the terminal of the user sends the play request to the server to obtain the video data of the video. The video to be played at the terminal of the user is the target video. In other words, the target video is the video that the user desires to view.

In the present embodiment, a candidate video found from all the candidate videos and recommended to the user that desires to view the target video may be referred to as a recommended video corresponding to the target video. After determining the target video based on the address in the play request sent by the terminal of the user, the server may find a candidate video as the recommended video corresponding to the target video from all the candidate videos based on the similarities between the content characteristic of the target video and the content characteristics of the candidate videos. The number of the recommended videos corresponding to the target video may be plural.

In the present embodiment, the content characteristic of the target video and the content characteristic of each candidate video may be vectorized to obtain a content characteristic vector of the target video and a content characteristic vector of each candidate video. Each component of the content characteristic vector of the target video corresponds to one of the content characteristics of the target video. Each component of the content characteristic vector of the candidate video corresponds to one of the content characteristics of the candidate video. The similarity between the content characteristic vector of the target video and the content characteristic vector of each candidate video may be separately calculated. Then, the candidate videos may be sorted in descending order of similarity, and a preset number of the sorted candidate videos may be defined as the recommended videos corresponding to the target video.

In the present embodiment, a pre-trained neural network that extracts the content characteristic of a video based on a plurality of images in the video may be used to extract the content characteristic of the video, to obtain the content characteristic vector of the video. The type of the neural network that extracts the content characteristic of a video based on a plurality of images in the video may be a bidirectional Long Short-Term Memory (LSTM).

In some alternative implementations of the present embodiment, for each of the candidate videos acquired by the server, a corresponding similar candidate video may be found from all the candidate videos based on the similarity of the content characteristics in advance. The number of similar candidate videos corresponding to a candidate video may be plural.

For a candidate video, the similarity between the content characteristic vector of the candidate video and the content characteristic vector of each of the other candidate videos except the candidate video may be separately calculated, then the similarities may be sorted in descending order, and a preset number of the sorted other candidate videos may be defined as the similar candidate videos corresponding to the candidate video.

The similar candidate video corresponding to each candidate video may be respectively found. Thus, when the target video is a candidate video, the similar candidate video corresponding to the candidate video may be defined as the recommended video corresponding to the target video.

In some alternative implementations of the present embodiment, when finding the similar candidate video corresponding to each candidate video from all the candidate videos, content characteristic vectors of all the candidate videos may be clustered to obtain a plurality of clustering results. Each clustering result includes the content characteristic vector of at least one candidate video.

For the content characteristic vector of each candidate video in a clustering result, the similarity between the content characteristic vector of the candidate video and the content characteristic vector of each of the other candidate videos in the clustering result may be separately calculated. For the content characteristic vector of a candidate video in a clustering result, after calculating the similarity between the content characteristic vector of the candidate video and the content characteristic vector of each of the other candidate videos in the clustering result, the candidate videos to which the content characteristic vectors of the other candidate videos in the clustering result belong may be sorted in descending order of the similarities to the content characteristic vector of the candidate video, and a preset number of the sorted candidate videos are defined as the corresponding cluster similar videos of the candidate video in the clustering result. Further, the corresponding cluster similar videos of the candidate video in the clustering result are defined as the similar candidate videos corresponding to the candidate video.

When searching for a cluster similar video corresponding to a candidate video in a clustering result, a Locality Sensitive Hashing Forest (LSH Forest) algorithm may be used to find content characteristic vectors of a preset number of other candidate videos having the highest similarity to the content characteristic vector of the candidate video in the clustering result, and further define the found candidate videos to which the content characteristic vectors of the preset number of other candidate videos having the highest similarity belong as the cluster similar video corresponding to the candidate video in the clustering result.

The similar candidate video corresponding to each candidate video in a clustering result may be found according to the method for finding the similar candidate video corresponding to a candidate video in a clustering result. The similar candidate video corresponding to each candidate video in each clustering result may be found according to the method for finding the similar candidate video corresponding to each candidate video in a clustering result.

Step 202, sending play information of the recommended video corresponding to the target video to the terminal of the user.

In the present embodiment, after finding the recommended video corresponding to the target video from all the candidate videos, that is, after finding the candidate video of the recommended video corresponding to the target video from all the candidate videos, the play information of the found recommended video corresponding to the target video may be sent to the terminal of the user. The play information of the recommended video may include the name of the recommended video, the link to the recommended video, a screenshot of the recommended video, or the like. At the same time, the video data of the target video may be sent to the terminal of the user.

Therefore, while the target video is played on the terminal of the user, the recommended video corresponding to the target video similar on video content to the target video may be recommended to the user.

Figure 3:
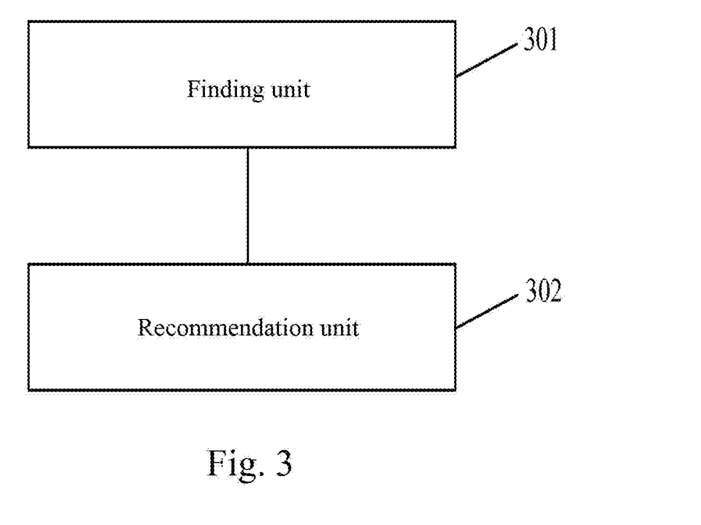
FIG. 3 illustrates a schematic structural diagram of an embodiment of an apparatus for recommending a video according to the present disclosure.

With further reference to FIG. 3, as an implementation to the method shown in the above figures, the present disclosure provides an embodiment of an apparatus for recommending a video. The apparatus embodiment corresponds to the method embodiment shown in FIG. 2.

As shown in FIG. 3, the apparatus for recommending a video of the present embodiment includes: a finding unit 301 and a recommendation unit 302. The finding unit 301 is configured to find a recommended video corresponding to a target video from all candidate videos based on similarities of content characteristics of the videos, the target video being a video to be played by a terminal of a user. The recommendation unit 302 is configured to send play information of the recommended video corresponding to the target video to the terminal of the user.

In some alternative implementations of the present embodiment, the apparatus for recommending a video further includes: a similar candidate video finding unit, configured to generate a content characteristic vector for each candidate video of all candidate videos, before finding a recommended video corresponding to a target video from all candidate videos based on similarities of content characteristics of the videos; and find a similar candidate video corresponding to each candidate video based on a similarity of the content characteristic vector.

In some alternative implementations of the present embodiment, the similar candidate video finding unit is further configured to: cluster content characteristic vectors of all the candidate videos to obtain a plurality of clustering results; and find, in the clustering results, a cluster similar video corresponding to each candidate video in the clustering result, and determine the cluster similar video corresponding to each candidate video in the clustering result as the similar candidate video corresponding to each candidate video, for each of the plurality of clustering results, based on the similarity of the content characteristic vector.

In some alternative implementations of the present embodiment, the finding unit is further configured to: when the target video is a candidate video in all the candidate videos, determine a similar candidate video corresponding to the target video as the recommended video corresponding to the target video.

Figure 4:
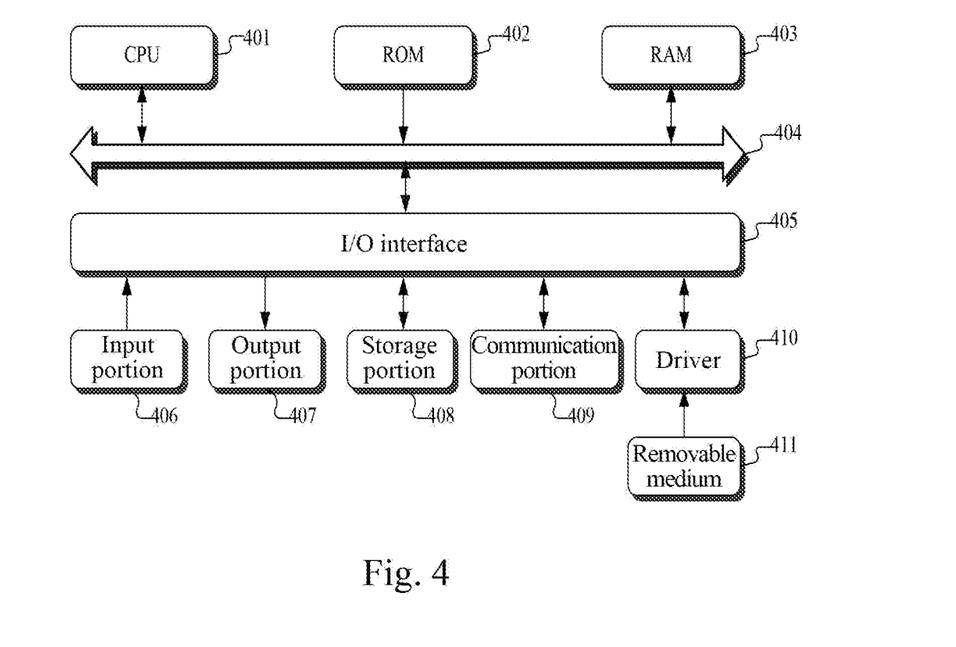
FIG. 4 illustrates a schematic structural diagram of a computer system adapted to implement a server of embodiments of the present disclosure.

FIG. 4 illustrates a schematic structural diagram of a computer system adapted to implement a server of embodiments of the present disclosure.

As shown in FIG. 4, the computer system includes a central processing unit (CPU) 401, which may execute various appropriate actions and processes in accordance with a program stored in a read-only memory (ROM) 402 or a program loaded into a random access memory (RAM) 403 from a storage portion 408. The RAM 403 also stores various programs and data required by operations of the system 400. The CPU 401, the ROM 402 and the RAM 403 are connected to each other through a bus 404. An input/output (I/O) interface 405 is also connected to the bus 404.

The following components are connected to the I/O interface 405: an input portion 406; an output portion 407; a storage portion 408 including a hard disk and the like; and a communication portion 409 comprising a network interface card, such as a LAN card or a modem. The communication portion 409 performs communication processes via a network, such as the Internet. A driver 410 is also connected to the I/O interface 405 as required. A removable medium 411, such as a magnetic disk, an optical disk, a magneto-optical disk, and a semiconductor memory, may be installed on the driver 410, to facilitate the retrieval of a computer program from the removable medium 411, and the installation thereof on the storage portion 408 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 409, and/or may be installed from the removable media 411. The computer program, when executed by the central processing unit (CPU) 401, implements the above mentioned functionalities as defined by the methods of the present disclosure.

In another aspect, the present disclosure further provides a server, the server may be configured with one or more processors; a memory, for storing one or more programs. The one or more programs may include instructions for performing operations described in above steps 201-202. The one or more programs, when executed by the one or more processors, cause the one or more processors to perform operations described in above steps 201-202.

In another aspect, the present disclosure further provides a computer-readable storage medium. The computer-readable storage medium may be the computer storage medium included in the apparatus in the above described embodiments, or a stand-alone computer-readable storage medium not assembled into the server. The computer-readable storage medium stores one or more programs. The one or more programs, when executed by a server, cause the server to: finding a recommended video corresponding to a target video from all candidate videos based on similarities of content characteristics of the videos, the target video being a video to be played on a terminal of a user; and sending play information of the recommended video corresponding to the target video to the terminal of the user.

It should be noted that the computer readable medium in the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fiber, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. In the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising a finding unit, and a recommendation unit.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for recommending a video, the method comprising:
generating, by using a pre-trained neural network, a content characteristic vector for each candidate video of all candidate videos based on a plurality of images in the each candidate video, wherein a component of the content characteristic vector generated for the each candidate video corresponds to a content characteristic comprising a text in an image in the each candidate video;
finding a similar candidate video corresponding to each candidate video based on a similarity of content characteristic vectors, comprising: clustering content characteristic vectors of all the candidate videos to obtain a plurality of clustering results; for the content characteristic vector of each candidate video in each clustering result of the plurality of clustering results, determining the similarity between the content characteristic vector of the candidate video and the content characteristic vector of each of other candidate videos in the clustering result, sorting the other candidate videos in a descending order based on similarities of the content characteristic vectors of the other candidate videos to the content characteristic vector of the candidate video, defining a top preset number of the sorted candidate videos as cluster similar videos of the candidate video in the clustering result, and defining the cluster similar video corresponding to each candidate video in the clustering result as the similar candidate video corresponding to each candidate video, each component of the content characteristic vector of the candidate video corresponding to a content characteristic of the candidate video, the content characteristic of the candidate video comprising text in an image in the candidate video;
finding a recommended video corresponding to a target video from all the candidate videos based on similarities of content characteristics of the videos, the target video being a video to be played on a terminal of a user; and
sending play information of the recommended video corresponding to the target video to the terminal of the user.

2. The method according to claim 1, wherein the target video is a candidate video among all the candidate videos; and
the finding a recommended video corresponding to a target video from all candidate videos based on similarities of content characteristics of the videos comprises:
defining a similar candidate video corresponding to the target video as the recommended video corresponding to the target video.

3. An apparatus for recommending a video, the apparatus comprising:
at least one processor; and
a memory storing instructions, the instructions when executed by the at least one processor, cause the at least one processor to perform operations, the operations comprising:
generating, by using a pre-trained neural network, a content characteristic vector for each candidate video of all candidate videos based on a plurality of images in the each candidate video, wherein a component of the content characteristic vector generated for the each candidate video corresponds to a content characteristic comprising a text in an image in the each candidate video;
finding a similar candidate video corresponding to each candidate video based on a similarity of content characteristic vectors, comprising: clustering content characteristic vectors of all the candidate videos to obtain a plurality of clustering results; for the content characteristic vector of each candidate video in each clustering result of the plurality of clustering results, determining the similarity between the content characteristic vector of the candidate video and the content characteristic vector of each of other candidate videos in the clustering result, sorting the other candidate videos in a descending order based on similarities of the content characteristic vectors of the other candidate videos to the content characteristic vector of the candidate video, defining a top preset number of the sorted candidate videos as cluster similar videos of the candidate video in the clustering result, and defining the cluster similar video corresponding to each candidate video in the clustering result as the similar candidate video corresponding to each candidate video, each component of the content characteristic vector of the candidate video corresponding to a content characteristic of the candidate video, the content characteristic of the candidate video comprising text in an image in the candidate video;

finding a recommended video corresponding to a target video from all the candidate videos based on similarities of content characteristics of the videos, the target video being a video to be played on a terminal of a user; and sending play information of the recommended video corresponding to the target video to the terminal of the user.

4. The apparatus according to claim 3, wherein the target video is a candidate video among all the candidate videos, and the finding a recommended video corresponding to a target video from all candidate videos based on similarities of content characteristics of the videos comprises:

defining a similar candidate video corresponding to the target video as the recommended video corresponding to the target video.

5. A non-transitory computer storage medium storing a computer program, the computer program when executed by one or more processors, causes the one or more processors to perform operations, the operations comprising:

generating, by using a pre-trained neural network, a content characteristic vector for each candidate video of all candidate videos based on a plurality of images in the each candidate video, wherein a component of the content characteristic vector generated for the each candidate video corresponds to a content characteristic comprising a text in an image in the each candidate video;

finding a similar candidate video corresponding to each candidate video based on a similarity of content characteristic vectors, comprising: clustering content characteristic vectors of all the candidate videos to obtain a plurality of clustering results; for the content characteristic vector of each candidate video in each clustering result of the plurality of clustering results, determining the similarity between the content characteristic vector of the candidate video and the content characteristic vector of each of other candidate videos in the clustering result, sorting the other candidate videos in a descending order based on similarities of the content characteristic vectors of the other candidate videos to the content characteristic vector of the candidate video, defining a top preset number of the sorted candidate videos as cluster similar videos of the candidate video in the clustering result, and defining the cluster similar video corresponding to each candidate video in the clustering result as the similar candidate video corresponding to each candidate video, each component of the content characteristic vector of the candidate video corresponding to a content characteristic of the candidate video, the content characteristic of the candidate video comprising text in an image in the candidate video;

finding a recommended video corresponding to a target video from all the candidate videos based on similarities of content characteristics of the videos, the target video being a video to be played on a terminal of a user; and sending play information of the recommended video corresponding to the target video to the terminal of the user.

* * * * *